Figures 1, 2, 3, 4:
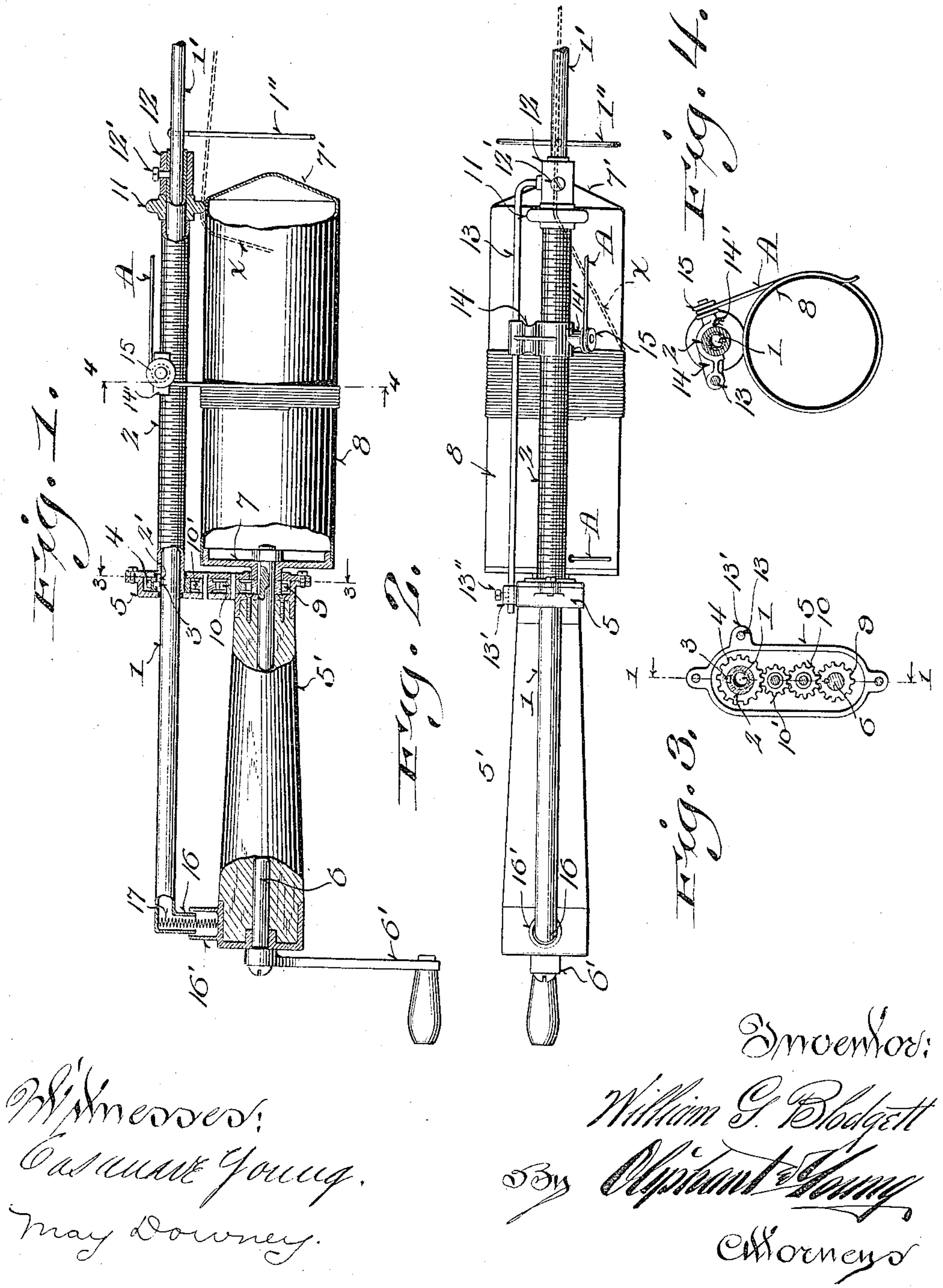

W. G. BLODGETT.

FISHING REEL.

APPLICATION FILED MAR. 23, 1914.

1,150,575. Patented Aug. 17 1915.

Witnesses:

Cassius Young.

May Downey.

Inventor:

William G. Blodgett

By Olyphant & Young

Attorneys

COLUMBIA PLANOGRAPH CO., WASHINGTON, D. C.

UNITED STATES PATENT OFFICE.

WILLIAM G. BLODGETT, OF MILWAUKEE, WISCONSIN.

FISHING-REEL.

1,150,575. Specification of Letters Patent. Patented Aug. 17, 1915.

Application filed March 23, 1914. Serial No. 826,685.

*To all whom it may concern:*

Be it known that I, WILLIAM G. BLODGETT, a citizen of the United States, and resident of Milwaukee, in the county of Milwaukee and State of Wisconsin, have invented certain new and useful Improvements in Fishing-Reels; and I do hereby declare that the following is a full, clear, and exact description thereof.

My invention refers to fishing tackle and has for its object to provide a simple, durable and effective casting reel, the arrangement and construction being such that the line is automatically spooled in a single layer to eliminate bunching and, in a casting operation, the line is free to strip from one end of the reel without snarling, provision being also made to facilitate frictionally loading the line, whereby efficiency is had in "playing" the fish before landing.

With the above and other objects in view the invention consists in certain peculiarities of construction and combination of parts as hereinafter set forth with reference to the accompanying drawings and subsequently claimed.

In the drawings, Figure 1 represents a side elevation of a reel embodying the features of my invention with parts broken away and parts in section as indicated by line 1—1 of Fig. 3; Fig. 2, a plan view of the same; Fig. 3, a detailed cross-section of the reel gear, the section being indicated by line 3—3 of Fig. 1, and Fig. 4, a detailed cross-section through the reel and line guide, the section being indicated by line 4—4 of Fig. 1.

Referring by characters to the drawings, 1 represents a hollow rod shank, into the forward end of which is telescopically fitted the section 1′ of the rod having a cord guiding loop 1″ depending therefrom. The rod shank has also revolubly mounted thereon a threaded spindle 2, which spindle is in the form of a sleeve, as shown. The rear end of the spindle is provided with a slot 2′ for engagement with a key 3, which key is carried by a toothed gear-wheel 4, the key and slot constituting a coupling connection, whereby the spindle may be slipped from its engagement with the gear-wheel in order to substitute a spindle having a thread of different pitch, it being understood that the pitch of the spindle thread will approximately correspond to the gage of the line as, for example, when a heavy line is used the thread will be coarse and when a fine line is employed the spindle thread will be correspondingly reduced in pitch per inch.

The gear-wheel 4 is housed within a hanger 5, which hanger constitutes a gear-casing and is supported upon the rod-shank. The lower end of the hanger 5 has secured thereto and extending rearwardly therefrom a centrally apertured grip 5′, into which aperture is revolubly mounted a drum-shaft 6 that projects beyond the grip and carries a driving crank 6′. The forward end of the shaft 6 projects through the hanger and has secured thereto the end cap 7 of a hollow drum 8, which drum is also closed at its outer end, whereby the same constitutes a float, the outer end cap 7′ being slightly conical to permit the line to shed freely therefrom. The drum-shaft 6 has secured thereto a driving gear-wheel 9, which gear-wheel is housed within the hanger 5 and imparts motion to a pair of intermediate gear-wheels 10, 10′, that are also incased within the housing, whereby motion is transmitted from the cranked drum shaft to the threaded spindle 2, the gear-wheel 10′ being in mesh with the spindle gear-wheel 4. The hanger is so suspended from the rod shank 1 as to permit slight rock in order that the free end of the drum may be tilted to effect disengagement with a line-shedding guide in the form of a roller 11, which roller is revolubly mounted upon the forward end of the rod-shank between the adjacent end of the spindle 2 and a collar 12. The collar 12 is held to the rod-shank by a set-screw 12′, which set-screw also impinges against the telescoped end of the rod-section 1′, whereby the latter is held. The collar 12 carries a guide-bar 13, which guide-bar extends rearward and in parallel relation to the spindle 2, the inner end of the said guide-bar being fitted through an ear 13′ that projects from the gear-casing or hanger 5. The rear end of the guide-bar is held in its engagement with the ear 13′ by a set-screw 13″, as best shown in Fig. 2.

A line spooling guide 14 is both hingedly and slidably mounted upon the guide-bar 13, the said line-guide being in the form of a block having a nut portion 14′ that is concavo-convexed and threaded for engagement with the threaded spindle 2. Hence it will be seen that when the spindle is revolved in either direction, the line spooling guide 14 will move in a corresponding direction through its gear connection, the said spindle making one revolution to each revolution of the drum. The line guide block also carries a sheave 15, over which the line A is adapted to travel, as shown in Figs. 1 and 2 of the drawings.

The front end of the rod-shank 1 is provided with a downturned hollow elbow 16, which elbow is in telescopic union with a cup 16′ that projects upwardly from the grip 5′ and housed within the elbow and cup is a coiled spring 17, the tension of which is adapted to force the end of the grip downwardly and the free end of the drum 7′ upwardly, whereby said drum end is held in engagement with the guide-roller 11.

As shown in Fig. 2, the end of the line A′ is made fast in any suitable manner to the rear end of the drum and in a spooling or winding operation the spooling guide 14 is lifted from its engagement with the spindle 2 and slid back to the rear end of the drum. The line which passes to the end of the pole through the loop 1″ is then looped over the pulley 15 of the spooling guide. The operator now revolves the drum 8 by manipulating the crank 6′, whereby the line is wound upon the drum in a close single layer due to the fact that the guide-block travels forward by its threaded engagement with the spindle the thickness of the line with each revolution of the drum, causing the line to be wound in a smooth even coil. The drum is of sufficient length and diameter to permit winding thereon of a standard length line and when the winding is completed the line spooling guide 14 will have reached the end of the spindle adjacent to the roller 11 constituting the shedding guide. The operator will now remove the line from the guide-pulley 15 of the spooling guide and loop the same under the shedding guide 11, as indicated by the dotted line *x* Fig. 1. This loop about the shedding guide 11 is effected by pressure exerted upon the grip 5′ and rod shank, whereby the shedding end of the drum is moved clear of the guide-roller 11 in order that the operator may loop the line about the edge of said shedding guide which contacts with the drum end. This will place a slight friction upon the line and the operator may now cast the line off and it will strip from about the drum without liability to overrun. If desired, however, in effecting the cast, the operator may free the end of the drum from the shedding guide-roller 11, whereby the line coiled about the drum will strip more readily and, in practice, under ordinary conditions, after the line has been spooled to effect a cast, it is preferable to tilt the free end of the drum from its engagement with the said shedding guide-roller 11, under which conditions a longer cast can be effected. It is also obvious that, after a "strike", the operator can permit the line to play off from the reel or take up the same as the conditions may require by suitable manipulation in obvious manner. The essential element in the apparatus is the arrangement whereby the line is coiled positively in a single layer in order that it may be shed without snarling in a casting operation. It is, as previously stated, obvious that, by the arrangement of threaded spindle, said spindle can be removed and a spindle of different pitch threads with its spooling line guide 14 may be substituted therefor.

I claim:

1. A reel comprising a rod shank, a threaded spindle mounted thereon, a hanger suspended from the rod, a drum disposed longitudinally of the rod shank having a shaft extending from one end and revolubly mounted in the hanger, the opposite end of said drum being unobstructed, a gear connection between the drum and threaded spindle, a threaded line guide engageable with the spindle, and a guide-bar for said line guide, and means for imparting endwise tilt to the unobstructed end of the drum.

2. A reel comprising a rod shank, a threaded spindle mounted thereon, a hanger suspended from the rod, a horizontally disposed drum having a crank-shaft extending from one end thereof and journaled in the hanger, a gear train connection between the drum shaft and threaded spindle, a threaded line guide engageable with the spindle, means for guiding the line guide longitudinally of said spindle, a guide carried by the rod shank and engageable with the free end of the drum, and a spring interposed between the rod-shank and drum spindle, whereby the free end of said drum is forced against the related guide.

3. A line winding reel comprising a rod shank, a drum disposed longitudinally of the shank having an unobstructed end over which the line is adapted to strip, means for winding the drum, a line shedding guide engageable with the unobstructed end of the drum, and means for permitting tilt of the unobstructed end of said drum relative to the shedding guide whereby the line coiled on the drum is free to strip endwise therefrom.

4. A revoluble reel having an unobstructed end, a line shedding guide engageable with the end, and means for separating the line shedding guide from the unobstructed end of said reel, whereby a line wound thereon is free to strip from said end.

In testimony that I claim the foregoing I have hereunto set my hand at Milwaukee in the county of Milwaukee and State of Wisconsin in the presence of two witnesses.

WILLIAM G. BLODGETT.

Witnesses:
GEO. W. YOUNG,
M. E. DOWNEY.

Copies of this patent may be obtained for five cents each, by addressing the "Commissioner of Patents. Washington, D. C."